(12) United States Patent
Mugan et al.

(10) Patent No.: US 12,632,751 B2
(45) **Date of Patent: *May 19, 2026**

(54) MODEL ECOSYSTEM

(71) Applicant: Pulselight Holdings, Inc., Austin, TX (US)

(72) Inventors: Jonathan Mugan, Buda, TX (US); Mallika Thanky, Chicago, IL (US)

(73) Assignee: Pulselight Holdings, Inc., Austin, TX (US)

( * ) Notice: Subject to any disclaimer, the term of this patent is extended or adjusted under 35 U.S.C. 154(b) by 38 days.

This patent is subject to a terminal disclaimer.

(21) Appl. No.: 18/656,459

(22) Filed: May 6, 2024

(65) Prior Publication Data

US 2024/0296355 A1 Sep. 5, 2024

Related U.S. Application Data

(63) Continuation of application No. 16/938,871, filed on Jul. 24, 2020, now Pat. No. 11,977,991, which is a continuation-in-part of application No. 16/430,035, filed on Jun. 3, 2019, now Pat. No. 11,488,723.

(60) Provisional application No. 62/879,250, filed on Jul. 26, 2019, provisional application No. 62/680,431, filed on Jun. 4, 2018.

(51) Int. Cl.
G06N 20/00 (2019.01)
G06N 3/045 (2023.01)
G06N 5/045 (2023.01)

(52) U.S. Cl.
CPC ............. G06N 5/045 (2013.01); G06N 3/045 (2023.01); G06N 20/00 (2019.01)

(58) Field of Classification Search
None
See application file for complete search history.

(56) References Cited

U.S. PATENT DOCUMENTS

| | | | |
|---|---|---|---|
| 2014/0095201 A1* | 4/2014 | Farooq | G16H 50/30 |
| | | | 705/3 |
| 2016/0092789 A1* | 3/2016 | Codella | G06N 20/00 |
| | | | 706/12 |
| 2021/0264318 A1* | 8/2021 | Butvinik | G06F 18/2411 |

FOREIGN PATENT DOCUMENTS

| WO | WO-2020163970 A1 * | 8/2020 | G06V 10/82 |
|---|---|---|---|

OTHER PUBLICATIONS

Liu, Chien-Liang, and Po-Yen Hsieh. "Model-based synthetic sampling for imbalanced data." IEEE Transactions on Knowledge and Data Engineering 32.8 (2019): 1543-1556. (Year: 2019).*

* cited by examiner

*Primary Examiner* — Jason B Dunham
*Assistant Examiner* — Constantine Siozopoulos
(74) *Attorney, Agent, or Firm* — J. Roger Williams, Jr.

(57) ABSTRACT

A system of machine learning ("ML") models for making actionable predictions regarding a low-incidence event, including a predictive ML model that has been trained on an augmented training data set comprising synthetic minority-class records to produce a prediction and a certainty ML model that produces a certainty estimate. A method of applying ML models to make an actionable prediction, including training a predictive ML model to make a prediction regarding a low-incidence event from a medical record, applying the predictive ML model to medical records to produce a prediction, and applying a certainty model to generate a certainty estimate. The low-incidence event may comprise risk of opioid use disorder.

20 Claims, 6 Drawing Sheets

400A

Patient 1234: Mean: 24%, Sigma: 5%

1 Standard Deviation

400B

Patient 5678: Mean: 23%, Sigma: 20%

1 Standard Deviation

600

MODEL ECOSYSTEM

CROSS-REFERENCE TO RELATED APPLICATIONS

This application is a continuation of co-pending U.S. Nonprovisional application Ser. No. 16/938,871, filed Jul. 24, 2020, which is hereby incorporated by reference in its entirety, which application is a continuation-in-part of U.S. Nonprovisional application Ser. No. 16/430,035, filed Jun. 3, 2019, which is hereby incorporated by reference in its entirety, and which claims the benefit of U.S. Provisional Application No. 62/680,431, filed on Jun. 4, 2018, which is incorporated by reference in its entirety, and which further claims the benefit of U.S. Provisional Application No. 62/879,250, filed on Jul. 26, 2019, which is hereby incorporated by reference in its entirety. The contents of each of the foregoing applications are incorporated in their entireties.

BACKGROUND OF THE INVENTION

The field of the invention is machine learning.

As used in this application, a machine learning model, or a "model," is the output of a machine learning algorithm that has been run on data. A model includes predictive data and procedures (data, data structures, numbers, weights, rules, methods, and/or procedures) that have been generated and iteratively improved by iteratively running the machine learning algorithm on training data. When new data is input into a model, the model uses the predictive data and procedures to make predictions based on the new data. A model can also be thought of as a computational process that generates decision or choice data from input data. These machine learning algorithm and machine learning models are computational processes that are performed by one or more processors that execute computer software program instructions and operate on data (including predictive data and procedures) that is stored in computer memory and that generate data that can be stored in computer memory. In this application, a model is not a mental process.

An exemplary application of ML models is predicting who is likely to suffer an opioid overdose or is at risk of opioid use disorder (OUD). There is a need for improved ML models to predict who will overdose on opioids in the coming year, or to decide whether a person is likely to overdose on opioids. Although a model may operate on data records, each data record corresponds to a specific patient, person, or entity, and predictions regarding a data records are also predictions regarding the patient, person or entity to which the data record corresponds.

Consider, for example, a ML model that is trained to predict opioid overdoses from data records. The classic machine learning paradigm is to train a model on labeled examples, examples where one already knows the outcome, to maximize accuracy of predictions. To train a model to predict opioid overdoses, one could use records of who overdosed in a previous year to predict who will overdose in the future. In this exemplary application, the data records are medical records, and the training labels are "overdose" and "no overdose." The medical records for those people that did overdose would get a label of 1 (for overdose), and the medical records for those that did not overdose would get a label of −1 (or 0). The trained model can be applied to a current dataset of unlabeled live (or production) data to predict who will overdose in the next year. As a further concrete case, one machine may read the medical records of an individual, pass those records to the model, and receive back a prediction.

One challenge in machine learning occurs when one wants to predict a class of low-incidence or rare events, events that happen infrequently. In machine-learning, this is called an "imbalanced class" problem, i.e., there is a highly imbalanced distribution of data between one or more major-ity classes and a minority class. Predicting who is at risk of OUD or opioid overdoses is an example of an "imbalanced class" problem. Although distressingly frequent, overdoses are low-incidence events. People who overdose in a particu-lar year are rare relative to those who do not. In a sample of medical records corresponding to a general population, the number of records corresponding to patients who overdosed in a particular year may be a very small fraction of the medical records corresponding to the entire population. If randomly-selected records from the general population are used to train a model, the model may learn to simply predict that no one will overdose and still be pretty accurate in this prediction. This makes it difficult to predict who will over-dose, when that is the real target of the inquiry.

One approach to this problem of imbalanced classes is oversampling. One can create copies of the minority class and use those multiple copies in the training data so that the classes are more balanced. The problem with this oversam-pling approach is that the copies do not add any new information, and so the model tends to overfit and learn to identify instances of only those copied records, and it then does poorly on new data.

Another approach is to do undersampling, whereby the algorithm throws out many of the majority class records (the people who did not overdose) to make the classes more balanced. This undersampling approach has the disadvan-tage of throwing away data, which also hurts the model when it is deployed to classify live data.

One technological approach to get around these difficul-ties of oversampling or undersampling is to augment the minority class with records that look like minority class records but are not exact copies, which is referred to as data augmentation. An existing method for data augmentation is called Synthetic Minority Oversampling Technique (SMOTE). The way that SMOTE works is for each example in the desired class, it finds the set of nearest neighbors also in that class and adds additional desired-class examples in between those pairs. The problem is that SMOTE does not work well in high-dimensional space because the concept of "nearness" breaks down (this phenomenon is called the "curse of dimensionality").

A high-dimensional space typically refers to a space with at least 10 dimensions, although some search spaces may have hundreds or thousands of dimensions. In a high-dimensional space, the volume of the space increases so quickly, as new records are added, that the data become sparse. This sparsity is problematic for computational pre-dictive models and other computational analytical methods that compare similarity between records because the size of the record space grows exponentially with the dimension-ality. Also, organizing and searching data often relies on detecting areas where objects form groups with similar properties. In high dimensional data, however, all objects appear to be sparse and dissimilar in many ways, which prevents common data organization strategies from being efficient. One often wants to identify objects that are near each other, under a well-defined distance metric, but con-ventional distance metrics and proximity functions are not efficient or reliable. In short, when data are sparse, it is less likely that records will have others nearby, and it becomes harder and more inefficient to computationally identify nearby records. This technological problem presents particular challenges for methods that generate synthetic records because those synthetic records should be similar or near to existing records of the same class.

Medical records (or electronic health records) are high-dimensional because of the number of different features that can determine or be measured with respect to health. Medical records typically include 10 to 1000 dimensions.

Accordingly, there is a need for improved machine learning models that can make accurate predictions regarding the minority class when the minority and majority classes are imbalanced. There is a need for improved machine learning models that can make accurate predictions regarding membership in a rare minority class. There is a need for improved machine learning models that can make accurate predictions from imbalanced classes. And there is a need for improved machine learning models that can make accurate predictions when the majority class and minority class are imbalanced and the data records are high-dimensional. One area in which these problems arise is in identifying who is at risk for OUD or opioid overdose.

In addition to improving the predictive models, it would be valuable to know how much certainty or confidence can be attributed to a prediction regarding an entity. Conventional machine learning algorithms work best when the proportion of entities in each class is balanced. Further, conventional machine learning algorithms always make predictions, even when they should have no confidence in doing so. In some situations, it is desirable to have a high degree of confidence or certainty in a prediction before taking action on it. In addition to improving the predictive models, it would be valuable to understand why a particular entity was classified in this way.

In other words, there is a need for improved machine learning models that, from a large collection of entities, can identify a subset that are confidently predicted to be in a rare class and explain why they were chosen. Consider, for example, a large collection of patients in a healthcare system. Most of these patients will not develop OUD, but a small portion will. It would be useful to be able to identify a subset of those patients that are at risk of OUD with known confidence or certainty. For each patient predicted to be at risk of OUD, it would also be useful to be able to explain why that patient is at risk. Information about the certainty of and explanation for a prediction can be used to determine appropriate or effective actions in response to the prediction.

BRIEF SUMMARY

Disclosed is a system of machine learning ("ML") models for making actionable predictions regarding low-incidence events. The system comprises input data records comprising features relevant to a low-incidence event, each input data record comprising one or more medical records, and an augmented data set of training medical records comprising synthetic minority-class records corresponding to the low-incidence event and generated by an iterative computational process. The system comprises a predictive ML model that has been trained on the augmented data set of training medical records wherein when applied to an input data record produces a prediction regarding the low-incidence event. A positive prediction comprises a prediction that there is a risk of occurrence of the low-incidence event or that the input data record is a minority-class record. The system comprises a certainty ML model which when applied to the input data record and the prediction will generate a certainty estimate comprising a probability that a positive prediction is correct.

Also disclosed is a method of applying machine learning models to make an actionable prediction regarding a low-incidence event from a medical record. The method comprises training a predictive ML model to make a prediction regarding a low-incidence event from a medical record, comprising training the predictive ML on an augmented data set of training medical records comprising synthetic minority-class records corresponding to the low-incidence event, applying the trained predictive ML model to an input data record comprising one or more medical records to produce a prediction that the input data record is or is not correlated with the low-incidence event, and applying a certainty ML model to the input data record and the prediction to generate a certainty estimate comprising a probability that the prediction is correct.

Also disclosed is a system of machine learning models for making actionable predictions regarding risk of opioid use disorder. The system comprises input data records, each input data record comprising one or more medical records, and an augmented data set of training medical records comprising majority-class records, original minority-class records corresponding to the low-incidence event and having a same minority-class label, and synthetic minority-class records having the same minority-class label. The system comprises a predictive ML model comprising a predictive neural network that has been trained on the augmented data set of training medical records, wherein when applied to an input data record the predictive ML model produces a prediction regarding risk of opioid use disorder. A positive prediction comprises a prediction that there is a risk of opioid use disorder or that the input data record is a minority-class record. The system comprises an explanatory ML model which when applied to the input data record and the prediction will generate explanatory data comprising features in the first input data record correlated with the prediction. The explanatory ML model associates weight values with input data record features, and the features in the input data record in the explanatory data correspond to the features with the highest weight values after application of the explanatory ML model. The system comprises a certainty ML model which when applied to the input data record and the prediction will use the predictive neural network to generate a certainty estimate comprising a probability that a positive prediction is correct. The system also comprises a display device for displaying the prediction, the explanatory data, or the certainty estimate.

Also disclosed are embodiments wherein the low-incidence event comprises risk of opioid use disorder or the prediction indicates possible or effective responses to the prediction.

DETAILED DESCRIPTION

Figure 3:
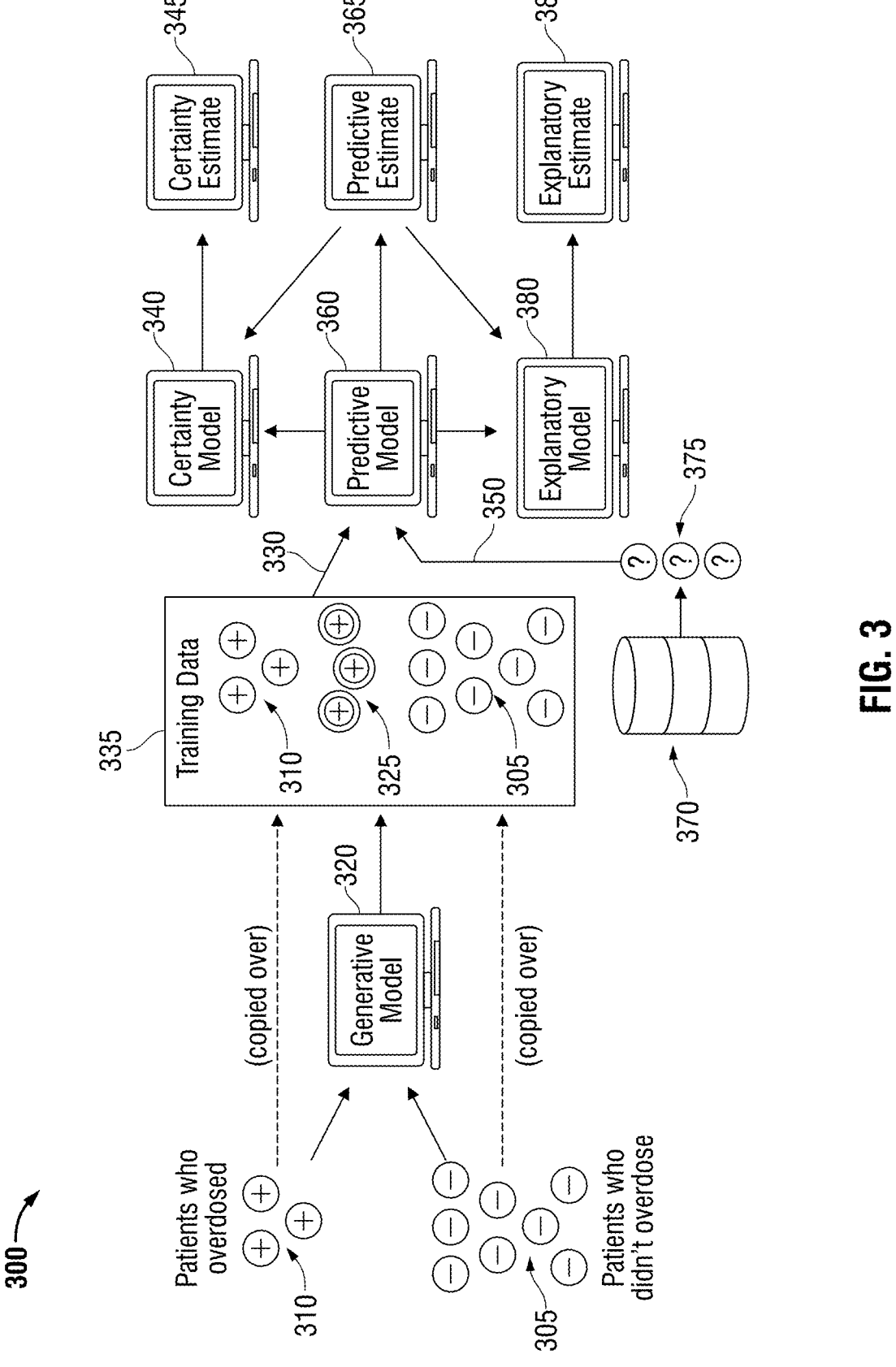
FIG. 3 illustrates an exemplary system of machine language models.

FIG. 3 illustrates an exemplary system 300 of machine learning models including generative model 320, predictive model 360, explanatory model 380, and certainty model 340. The exemplary application illustrated in FIG. 3 is the identification from medical records of individuals who are at risk for opioid overdoses or OUD. In an embodiment, generative model 320 addresses the imbalanced class problem in this data set by generating synthetic data records 325 in the minority class. The synthetic minority-class data records 325 are combined with actual minority class data records 310 (e.g., records of patients who overdosed) and actual majority class data records 305 (i.e., patients who did not overdose) to make an augmented data set of training data 335. The training data 335 can be used as training data (330) to train predictive model 360.

After it has been trained, the predictive model 360 can be used to make predictions regarding live data 375 from live or production data set 370, which may be stored in a database. For example, the live data 375 may include all medical records for Medicaid clients in a county. The live data 375 is supplied as input data (350) to predictive model 360. Applied to the live data 375, the predictive model 360 produces a predictive estimate or prediction 365. Preferably the predictive model 360 produces a prediction for each input data record. In the exemplary application, the prediction 365 for each data record is whether the data record indicates a risk, or no risk, of OUD. Certainty model 340 can generate a certainty estimate 345 regarding the prediction for specific data records, and explanatory model 380 can generate an explanatory estimate 385 regarding the prediction for specific data records.

The system shown in FIG. 3 produces actionable predictions of events in a minority class. The synthetic minority-class training records produced by the generative model improve the performance of the predictive model and enable it to more accurately predict whether a live data record is in the minority class. The certainty model produces a certainty estimate for each prediction. In some cases, the level of certainty in a prediction may determine what kind of action to take. Taking an action refers here to any form of effective or appropriate action (or refraining from acting) in response to a prediction. In the context of detecting those at risk of OUD, actions may include any number of formal or informal responses, therapeutic techniques, interventions, or mitigating actions. Some kinds of responsive actions may be effective or appropriate only when there is a high degree of certainty in the prediction, other types of responsive actions are effective or appropriate regardless of the level of certainty, and sometimes it may be appropriate to act when there is a low degree of certainty (as in a situation where predictions may be "false negatives"). The explanatory model produces data that explains why the predictive model made its prediction. Knowing the specific features in a data record that influenced the prediction is likely to determine which responsive actions are likely to be effective or appropriate.

Generative Model

The generative model 320 addresses the "imbalanced class" problem, i.e., the problem of finding entities that are in rare classes. This imbalance in the data means that the model must learn to identify predictive patterns in the presence of large amounts of irrelevant data. The generative model addresses this problem by creating synthetic training records to augment the training data for a predictive model.

An embodiment of a generative model is a feature predictor that generates records by changing existing records such they could still be the same minority class. An exemplary embodiment of this approach augments minority class data by learning to generate variations of the minority class records that are still likely to be in that minority class.

Data records consist of a set of features, and for each feature, a model can be trained to predict the likely values of that feature given the other features in the record. If the feature model says that the feature could have had a value other than the value it does have, a new record is created that is a copy of the original record but with the feature set to the predicted value. Embodiments applied to high-dimensional spaces surmount or get around the "curse of dimensionality" by not looking for pairs of "nearby" records and instead changing one or more features of a record to ensure that it is nearby or to create another that is "nearby."

As an example, imagine building a model to classify expensive cars from inexpensive ones. The record for each car has a feature "color" that can take the values "red" or "blue", a feature "seat material" that can take the values "leather", "cloth", or "vinyl", and many other features. We want to do classification, but while we have many records of inexpensive cars, we don't have many examples of expensive cars. We want our algorithm to create new instances of expensive cars.

Given a blue expensive car with cloth material, the algorithm could learn that it could copy this car record and add a new record where the material was leather (because presumably there are some expensive blue cars with leather interior). The algorithm could also learn that it could copy the original record and add a new record where the color of the car was red. But since vinyl material is not associated with our set of expensive cars, the model would not be able to copy this record and replace it with one with vinyl material.

In an exemplary embodiment, the model function is a software program, package, or suite of software applications. The software includes computer instructions, and is stored in computer-readable media. The function of the model is performed by one or more computer processors executing the computer instructions. The input medical records preferably are data records stored in computer-readable media.

Figure 1:
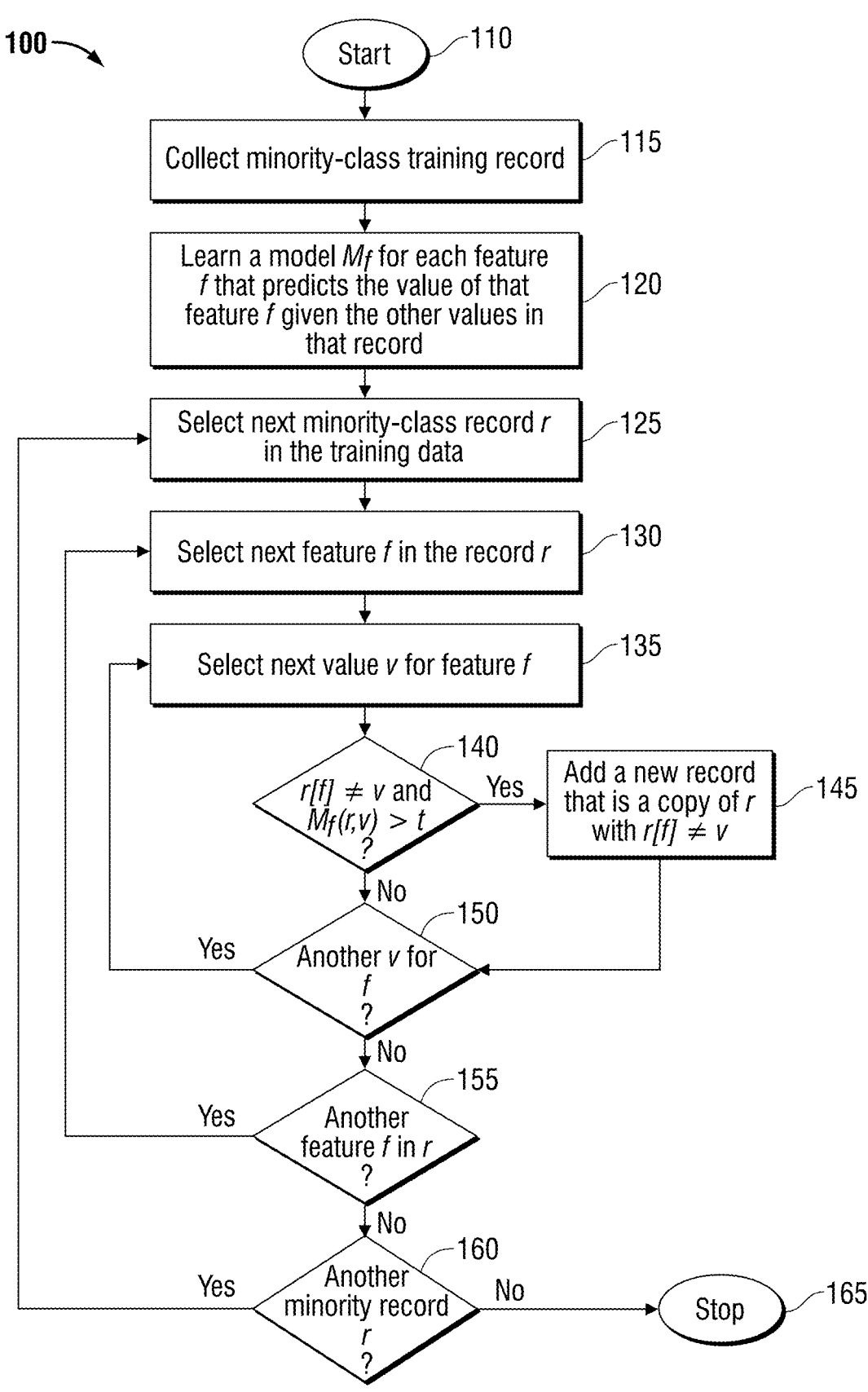
FIG. 1 describes the steps of an exemplary method of feature prediction for minority class data augmentation.

An embodiment of an algorithm 100 for generating synthetic records is shown in FIG. 1.

Step 115 is to collect all of the records in the minority class. Each record consists of a set of features where each feature has a value. Each record in the minority class, in an embodiment, is stored in a computer-readable media.

Step 120 is then to learn a model that predicts the value of each feature given all of the other values of the features for that record. This model is learned over those minority class records collected in step 115. For example, if there are four features in the records from step 115, then step 120 will learn four models, and the model for feature $f$ is represented with the notation $M_f$. The model $M_f(r,v)$ takes a record r and gives the probability of feature $f$ having value (or class or classification) v. These feature models can be learned (or trained) using, for example, logistic regression. In an embodiment in which every feature is a binary classification, a binary logistic regression model can be used. In an embodiment in which a feature may have more than two classifications, a multinomial logistic regression can be used. In an alternative embodiment, a feature with categorical or multiple classes (multi-class) can be represented as binary values using "one-hot" encoding. An exemplary logistic regression model for use with embodiments can be found in the software library scikit-learn at https://scikit-learn.org/stable/modules/generated/sklearn.linear_model-.LogisticRegression.html, which is hereby incorporated by reference.

After the feature models are learned, the method loops through the minority class records and makes a copy of each record where a feature model says that its feature is likely to have some other value. Step 125 loops over the minority class records, and considers each record r one at a time. Step 130 loops over the features for record r and considers each feature *f* one at a time. Step 135 loops over each possible value for feature *f* and considers each value v one at a time.

Step 140 computes whether the current value for record r for feature *f* is equal to v, and if it is not, it computes whether the probability of feature *f* having value v is greater than a threshold t, represented by $M_f(r,v)>t$. If both of these conditions are satisfied, step 145 adds a new record to the set of augmented records. This new record is a copy of record r where feature *f* is set to have value v. After all of the records have been processed, the algorithm stops in step 165. In an embodiment, the value of t is 0.2. In alternative embodiments, the value may range between any of these ranges: 0.175-0.25, 0.2-0.3, 0.2-0.4, 0.3-0.4, 0.2-0.5, 0.3-0.5, 0.4-0.5, 0.2-0.6, 0.3-0.6, 0.4-0.6, 0.5-0.6, 0.2-0.7, 0.3-0.7, 0.4-0.7, 0.5-0.7, 0.6-0.7, 0.175-0.5, and 0.175-0.7.

The result is a set of augmented records that can be used along with the minority class records during training. These augmented records have the label of the minority class. The augmented records, in an embodiment, are stored in a computer-readable media.

In an embodiment relevant to the study of opioid overdoses, the overdose would be the class or classification, will this person overdose or not? The features are the aspects of the person the model uses to classify whether the person will overdose, such as age and whether that person is currently taking opioids.

We looked at processed binary medical-data records to determine who would overdose in the next year. Each record had 73 binary features. For training, there were 133,728 records, where 744 of those were positive. For testing, there were 2,828 records, where 17 were positive. "Positive" means that an overdose occurred in the following year.

When we used our feature prediction model, it added 7,923 positive records to the training set, giving 8,667 positive training records. The augmented set of training records (including the synthetic positive records) were fed to the training model. We call this condition "real+pred" and the condition where the prediction algorithm was not used is called "only_real." We also consider two conditions for evaluation:

a. Balanced means the positive records in the test set were oversampled so there were as many positive as negative. This makes the accuracy meaningful.

b. Raw means like it was with 17 positive records, where the system can always predict "negative" and have an accuracy of 99%.

The results are shown in table 1 below. F1 is the F1 Score and AUC is area under the curve (receiver operating characteristic).

TABLE 1

| | Accuracy | Raw F1 | AUC | Accuracy | Balanced F1 | AUC |
|---|---|---|---|---|---|---|
| only_real | .994 | 0 | .765 | .499 | 0 | .765 |
| real + pred | .985 | .157 | .795 | .612 | .378 | .795 |

We see that the "real+pred" condition does much better on everything other than raw accuracy. Raw accuracy doesn't mean much here because the "only_real" condition classified all records as being negative (not overdose). This is also why F1 is 0 for "only_real."

An alternative embodiment of a generative model 320 includes a generative adversarial network (GAN). A GAN consists of a generator neural network that creates synthetic records and a discriminator neural network that tries to distinguish the real records from the synthetic ones. The two networks battle each other in an adversarial relationship, with the generator continually learning to create better synthetic records and the discriminator continually getting better at telling the real records from the synthetic ones. The result is a trained generator can be used to create synthetic records so that the dataset becomes more balanced and the model can more easily find the predictive patterns. Exemplary methods for creating and using a GAN are described in Ian J. Goodfellow, Jean Pouget-Abadie, Mehdi Mirza, Bing Xu, David Warde-Farley, Sherjil Ozair, Aaron Courville, Yoshua Bengio, Generative Adversarial Networks, https://arxiv.org/abs/1406.2661 (Goodfellow et al., 2014), incorporated here by reference.

Figure 5:
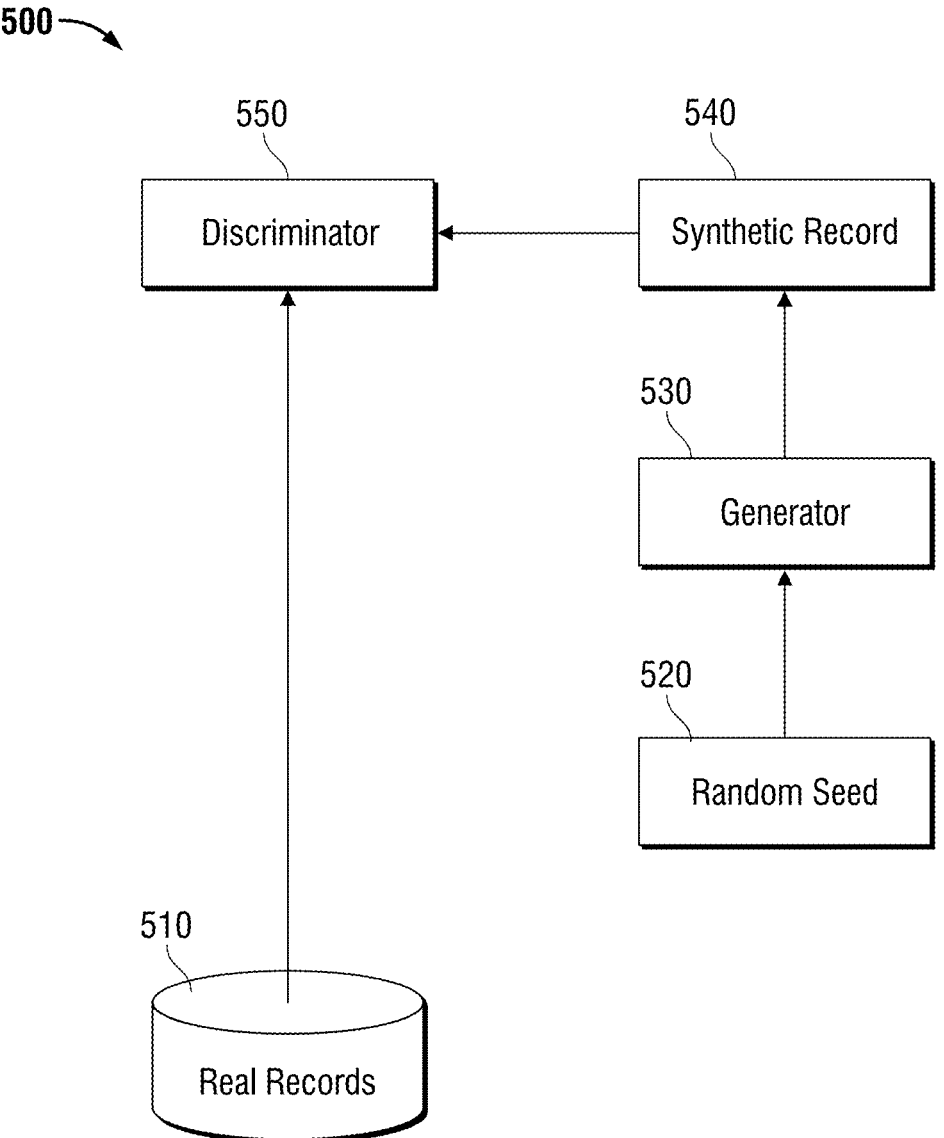
FIG. 5 illustrates the conceptual components of an exemplary generative adversarial network.

FIG. 5 shows an exemplary GAN. When the generator neural network 530 creates a synthetic record 540 from a random number 520, the discriminator neural network 550 uses what it has learned from the real records 510 to determine whether the synthetic record is real or not. This becomes a supervised learning problem for the discriminator and the error function creates a gradient that is passed back to the generator 530 to improve the generator 530's ability to create realistic synthetic records.

After training, an embodiment can use the generator 530 to create synthetic records to help train the predictive model. Generator 530 can be used as an alternative to the feature predictor or in conjunction with it. Using a GAN to generate synthetic data records creates an improved set of training data for the predictive model, which in turn improves the quality of the predictions made by the predictive model by improving the predictive data and procedures of the predictive model.

Predictive Model

In an embodiment, the predictive model 360 includes a machine learning classifier where the model is trained on examples where one already knows the outcome. This predictive model is applied to live data to produce a predicted classification (prediction or prediction estimate).

Nonlinear Parametric Models. One embodiment of a predictive model is a neural network, which is a nonlinear parametric model. Consider a set of training examples (X,Y) where each element of $(x_i, y_i) \in (X,Y)$ consists of an instance where $x_i$ is the features and $y_i$ is what we want to predict. Assume that there are n training instances in (X,Y). We want to learn a function of the form $$y = f(x)$$

The function $f$ that we will learn is a nonlinear parametric function. One simple such function could be $$y = f(x) = \sigma(wx + b) = \sigma(g(x))$$

Where $g(x)=wx+b$, $w$ is a vector of parameters, $b$ is a single parameter, and $\sigma$ is a nonlinear function, for example, a sigmoid. To learn function $f$, we need to learn values for the parameters $w$ and $b$, and an embodiment does this by searching for a set of values for those parameters that allow function $f$ to best approximate the training data $(X,Y)$.

We will use an embodiment of an error function $E(w,b)$ that measures how well the values for parameters $w$ and $b$ allow function $f$ to approximate the training data $(X,Y)$.

$$E(w, b) = \frac{1}{2}\sum_{i=1}^{n}(y_i - f(x_i))^2 = \frac{1}{2}\sum_{i=1}^{n}(y_i - \sigma(wx + b))^2$$

We set the parameters to initial values, such as random values from a Gaussian distribution, or zeros; and we iteratively update the parameters to lower the value of the error function using gradient descent. Gradient descent is an iterative method where we set the values of the parameters, compute gradient $\nabla E(w,b)$ of the error function $E(w,b)$ at those parameter values, and use the gradient to update the parameter values. The gradient may be computed automatically using PyTorch, TensorFlow, or other commercially available software libraries, and the steps involved in computing a gradient are within the knowledge of the person of ordinary skill in the art. The following discussion describes an exemplary method of computing the gradient in an embodiment.

The gradient $\nabla E(w,b)$ is a vector representing the point of steepest ascent in parameter space. If we let $w_i$ represent a parameter value, such as $b$ or at an index in vector $w$, and if we assume that there are m such parameter values (in this case $w$ is a vector of length m−1), we can write the gradient as $$\nabla E(w, b) = \left[\frac{\partial E}{\partial w_j}, \ldots, \frac{\partial E}{\partial w_m}\right]$$

Gradient descent updates the parameters using the equation $$w_j = w_j + \Delta w$$

where $$w = -\alpha\frac{\partial E}{\partial w_j}$$

where $\alpha$ is the learning rate, such as 0.2. The negative sign is there because we want to go in the opposite direction of the error; we want to reduce error. The gradient vector $\nabla E(w,b)$ determines in what direction we go to update the parameters, and the learning rate determines how far we go in that direction to update the parameters.

To compute $\partial E/\partial w_i$, we use the chain rule of derivatives $$\frac{\partial E}{\partial w_j} = \frac{dE}{df}\frac{df}{dg}\frac{\partial g}{\partial w_j}$$

where $$\frac{\partial E}{\partial w_j} = \frac{d}{df}\frac{1}{2}\sum_{i=1}^{n}(y_i - f(x_i))^2\frac{df}{dg}\frac{\partial g}{\partial w_j} = \sum_{i=1}^{n}(y_i - f(x_i))\frac{df}{dg}\frac{\partial g}{\partial w_j}$$

In an embodiment, the nonlinearity $\sigma$ is the sigmoid function $$\sigma(wx + b) = \frac{1}{1 + e^{-(wx+b)}}$$

which has the derivative $$\frac{df}{dg} = \frac{d\sigma(wx + b)}{dg} = \sigma(wx + b)(1 - \sigma(wx + b)) \text{ and}$$

$$\frac{\partial g}{\partial w_j} = x_{ij}$$

where $x_{ij}$ is the jth value of input vector i. In total, we have $$\frac{\partial E}{\partial w_j} = \sum_{i=1}^{n}(y_i - \sigma(wx + b))\sigma(wx + b)(1 - \sigma(wx + b))x_{ij}$$

Explanatory Model

The explanatory model 380 takes a prediction 365 made by the predictive model 360 on a specific data record and produces an explanation, preferably in human-understandable terms, of why the predictive model is predicting that class for that entity. In an embodiment, for each data record of interest, the explanatory model explains the predictions of the predictive model by learning a simple and interpretable model in the feature space near the data record that gives similar predictions as the predictive model. An exemplary embodiment of an explanatory model is the software package LIME (Local Interpretable Model-Agnostic Explanations), source code for which may be accessed at https://github.com/marcoter/lime and is incorporated here by reference.

In an embodiment, the explanatory model 380 samples the space around a data point $(x^*,y^*)$ of interest and notes the predictions of the complex model on those samples, generating a dataset $(X,Y)$. Here, $x^*$ refers to the data values in the data record that produced the prediction, and $y^*$ refers the prediction produced by the predictive model on that data record. For example, if $x^*$ had three features, $f1$, $f2$, and $f3$ with the values (0.34, 0.42, 0.96), a record near $x^*$ might be a record having the values (0.32, 0.44, 0.95). For categorical records (records with discrete field values such as True/False or a color), a nearby record can be synthesized by changing a single discrete value.

The explanatory model 380 preferably performs two steps: (1) Find the K most important features using a linear model with L1 regularization. (2) Use those K features to fit a second linear model with L2 regularization. The weights of the model in step 2 provide the explanation.

A linear model is a model predicts a value $\hat{y}_j$ given a vector $x_j$ and is of the form $\hat{y}_j = \Sigma_i x_{ji} w_i + b$. The $w_i$ values are weights and the b value is also a weight. The weights are chosen so that across all records (X,Y) the average value of the squared difference of the predicted value $\hat{y}_j$ and the actual value $y_j$ is minimized, represented by $\Sigma_j (\hat{y}_j - y_j)^2$. This is called the error. Using L1 regularization adds an additional constraint that the weights should minimize both the error and the value of the weights.

Thus, L1 regularization finds weights that minimize $$\Sigma_j (\hat{y}_j - y_j)^2 + \Sigma_i |w_i| + b.$$

Similarly, L2 regularization finds weights that minimize $$\Sigma_j (\hat{y}_j - y_j)^2 + \Sigma_i w_i^2 + b^2.$$

Finding the weights that minimize the error and the regularization can be done by a person of ordinary skill in the art. In this embodiment, L1 regularization is used in step 1 because L1 is good for forcing weights to be close to 0, and L2 regularization is used in step 2 because it is the standard method for making models that generalize well. Finding the K most important features in step 1 then means choosing the K features with the highest weights after regularization.

An alternative embodiment notes the similarity $\pi_{x}\cdot(x)$ of each point $(x,y) \in (X,Y)$ and minimizes the error $$\sum_j \pi_x * (x_j)(\hat{y}_r - y_j)^2 + \sum_i |w_i| + b$$

for step 1 and the error $$\sum_j \pi_x * (x_j)(\hat{y}_r - y_j)^2 + \sum_i w_i^2 + b^2$$

for step 2. Again, finding the weights that minimize these equations can be done by a person of ordinary skill in the art. This technique attempts to measure how well this second model does on records around the original data point (x*, y*). Weighing the points by their distance to the original point may give a better estimate.

Different embodiments of explanatory models produce the explanatory data in different formats. In an embodiment, the explanatory model outputs the features of the data record that the model found to be most important in making the prediction as well as the quantified contribution to the prediction and their direction.

Figure 6:
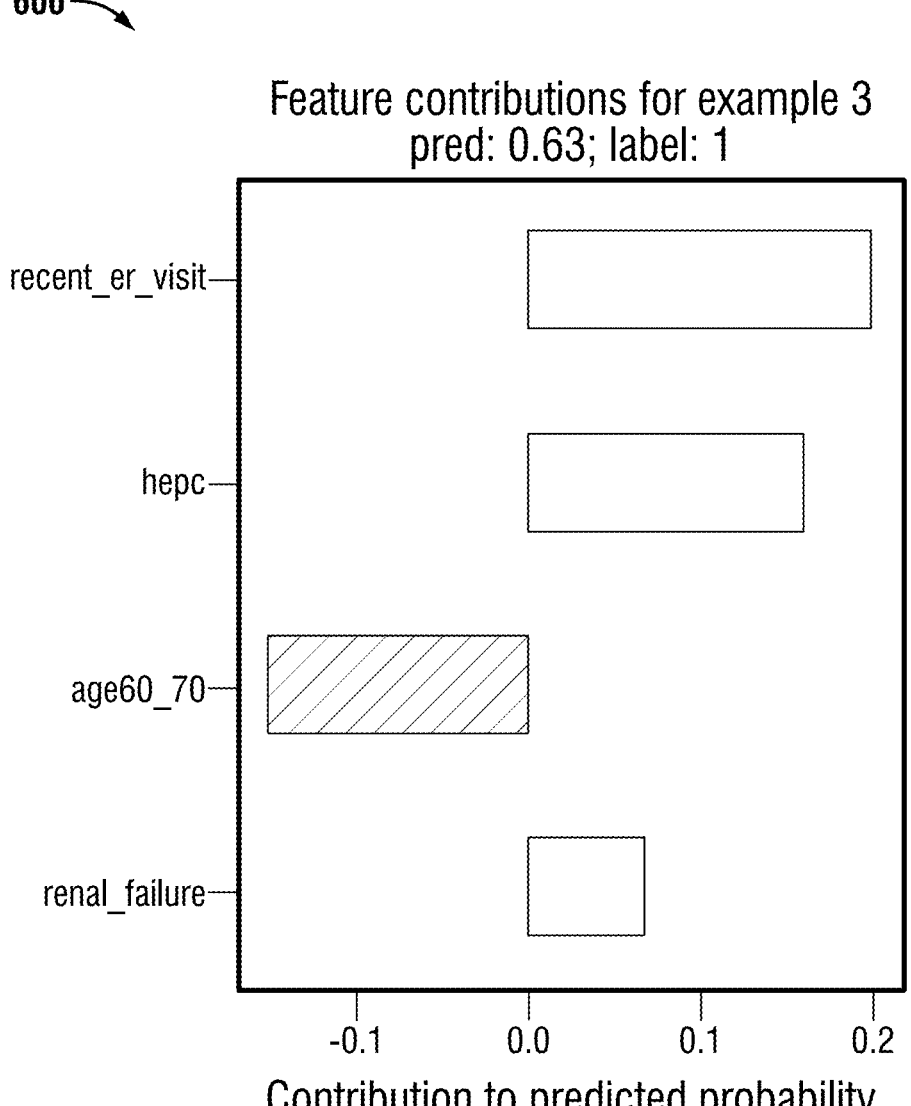
FIG. 6 illustrates an exemplary graphical explanation of a prediction.

FIG. 6 illustrates an exemplary graphical explanation 600 of a prediction that a person is at risk of OUD. The model is based on many features, but for this particular person, the data features that contributed most to the prediction are the feature values for recent visit to the emergency room, hepatitis C, and renal failure. The resulting explanation is that this patient is at risk of OUD because she has been to the emergency room recently and has hepatitis C and renal failure. A mitigating factor for this individual is her age.

In the exemplary environment of investigating medical records for persons at risk of OUD, each medical data record preferably corresponds to a specific patient, individual, or entity. Note that the explanatory model is not saying what features are important for the overall population. What this model does is show what features are important for each specific patient, individual or entity (or the associated data records). The features identified as important to or determinative of the prediction for a particular data record can be provided to a healthcare provider or other person interested in the patient, individual or entity. By identifying the features that are most important to the prediction for this specific patient (or data record), the explanatory model makes the prediction more actionable, because different features determine different actions in response to the prediction. For example, in the exemplary explanation 600 shown in FIG. 6, the fact that the explanatory model identified a recent visit to the emergency room as an important explanatory feature suggests that an appropriate or effective response would be to trigger a follow-up call to the patient from a hospital social worker where the patient was recently treated.

In an alternative embodiment, the explanatory model 380 and the predictive model 360 can interface with database 370 and a computer program (not shown on FIG. 3) that is programmed to automatically produce specific response actions tailored to specific features, or combinations of features, is identified as important by the explanatory model.

Certainty Model

The certainty model 340 takes the prediction 365 produced by predictive model 360 for a specific data record and produces a certainty estimate 345 regarding the prediction for that specific data record. An exemplary embodiment of a certainty model is described in Gal, Uncertainty in Deep Learning, which may be accessed at http://www.cs.ox.ac.uk/people/yarin.gal/website/thesis/thesis.pdf and which is incorporated here by reference.

In an embodiment, the certainty model 340 uses an approximation of Bayesian neural networks. Bayesian neural networks are difficult to work with, but they can be approximated using dropout. Dropout means that some values in the network are randomly set to 0.

This exemplary certainty model 340 samples from the neural network of the predictive model multiple times to get a probability distribution over the probability of the prediction. Preferably, a variation ratio is used. For record r, T samples are collected from stochastic forward passes (using dropout). For each sample, a label is sampled based on the probability. The Variation Ratio is:

$$1 - \frac{\#maxclass}{T}.$$

The "maxclass" term is the feature class that has the most samples, and "#maxclass" refers to the number of samples in that class.

Consider the following hypothetical examples where T=3, and the potential values for the label are 0 or 1. For hypothetical patient 1234, the hypothetical probabilities of the samples are 0.18, 0.31, and 0.23, with a mean value of 0.24 risk of an adverse event. Sampling from those probabilities yields 0, 0, and 0. The variation ratio for patient 1234 is 0:

$$1 - \frac{3}{3} = 0.$$

For hypothetical patient 5678, the hypothetical probabilities of the samples are 0.08, 0.51, and 0.10, with a mean value of 0.23 risk of an adverse event. Sampling from those probabilities yields 0, 0, and 1. (Note that it was the third sample that gave a value of 1. Even though sampling with probability 0.10 will give a label of 0 90% of the time, in this example it gave a 1.) The variation ratio for patient 5678 is 0.33:

$$1 - \frac{2}{3} = 0.33$$

Figure 4A:
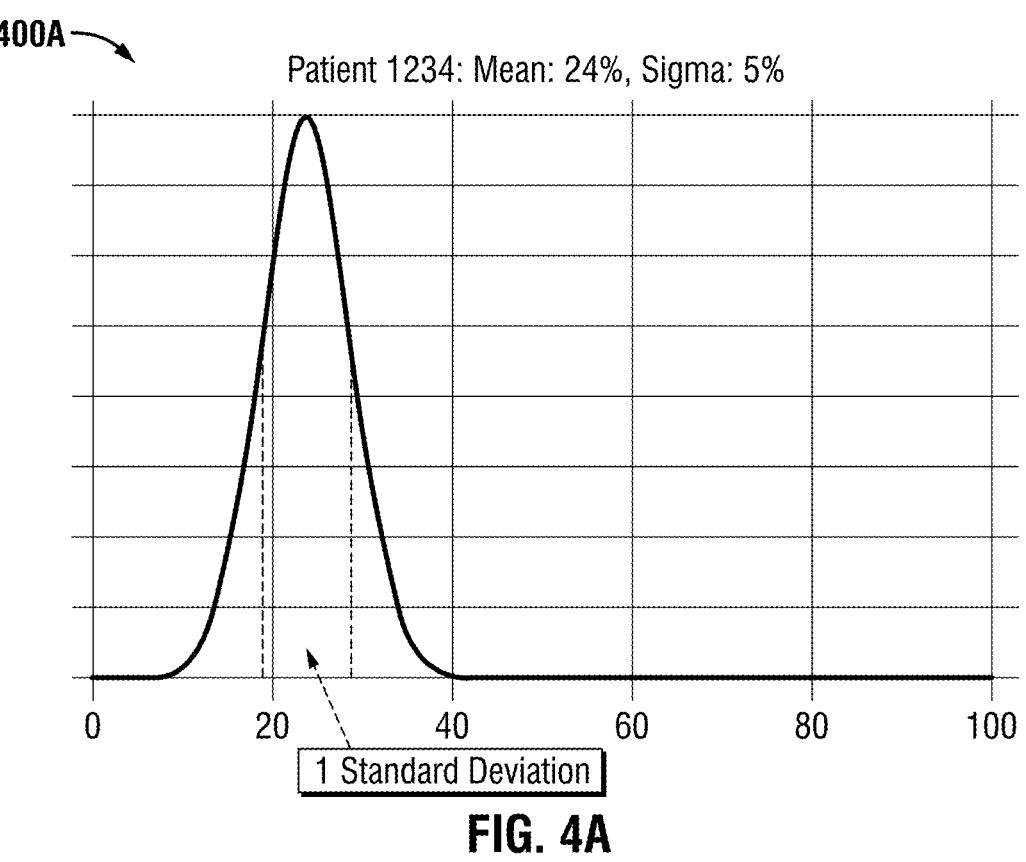
FIGS. 4A and 4B illustrate exemplary mean and variance distributions.
Figure 4B:
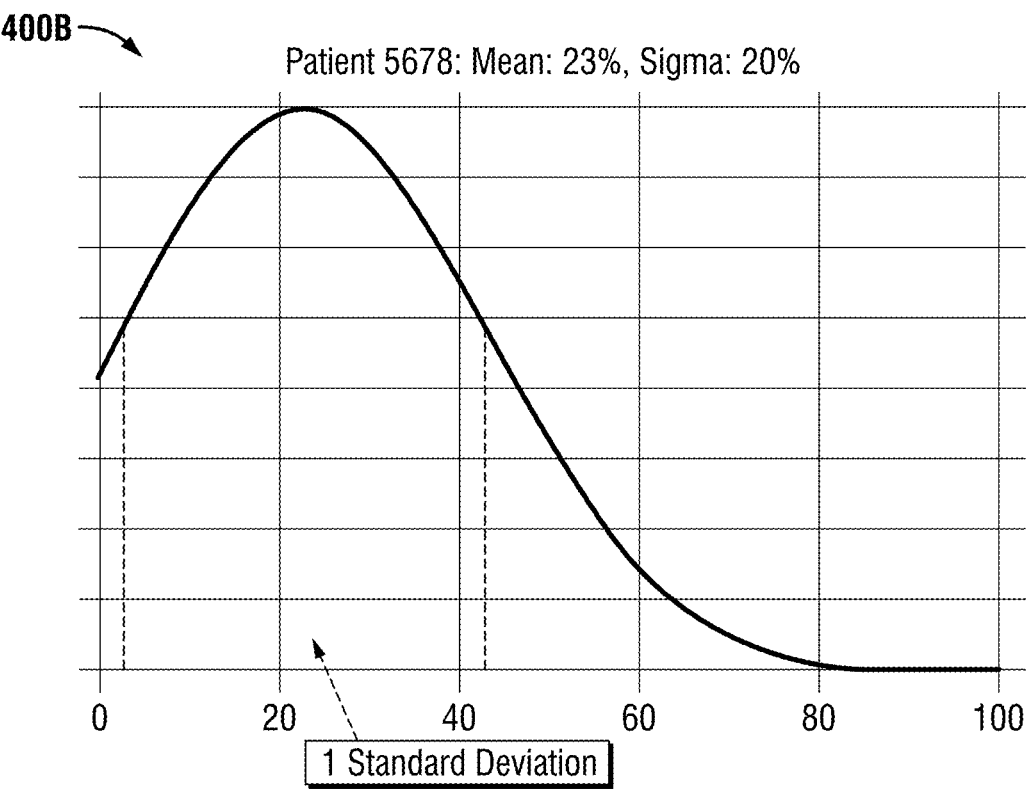

Since the model for patient 5678 has a higher variation ratio, the model is considered less reliable for 5678 than for 1234. Even though patient 5678 has a lower mean value of unplanned admission or adverse event, there is more cause for concern about patient 5678 because the prediction is less certain. FIGS. 4A and 4B illustrate different mean and variance distributions for hypothetical patients 1234 and 5678.

In an embodiment, the certainty estimate 345 produced by the certainty model 340 is a probability. In an alternative embodiment, the certainty estimate is a mean. In an alternative embodiment, the certainty estimate is a binary value (e.g., certain/not certain) based on pre-determined parameters encoded into the certainty model 340.

Some kinds of responsive actions may be effective or appropriate only when there is a high degree of certainty in the prediction, whereas other types of responsive actions are effective or appropriate regardless of the level of confidence. For example, a high degree of certainty in a prediction (or set of predictions) might be desirable before initiating an investigation of potential fraud or neglect. On the other hand, if it is important to contact everyone at risk of OUD—for example, to send an informational letter warning of the dangers of opioids or signs of OUD—it might be appropriate or effective to reach out (a) to everyone predicted to be at risk of OUD, with any level of certainty, and (b) to everyone who is predicted to be not at risk of OUD, but with low certainty. This approach mitigates the risk of "false negative" predictions by the predictive model. In these and similar scenarios, the certainty estimate determines which actions are effective or appropriate in response to a prediction.

The output of the certainty model 340 can be used to determine which records are tested by the explanatory model 380. For example, some embodiments of the explanatory model 380 are computationally expensive (in money or in time). To conserve computational expenses, one may elect to apply the explanatory model 380 only to predictions with high certainty levels.

In an alternative embodiment of certainty model 340, the certainty model can directly estimate probability that the predictive model is correct for a particular entity. It does this by making the certainty model a second predictive model structured and trained just like the first, with two differences. The first difference is that the certainty model is trying to predict not the class of the entity but whether the predictive model will assign the entity to the right class. The second difference is that the input to the certainty model gets the output of the predictive model as an additional feature, in addition to all of the features that the predictive model gets.

The embodiment of certainty model 340 assumes that the predictive model 360 includes a neural network, but the second embodiment does not. The first embodiment assumes the predictive model is a neural network, and the certainty model then takes that neural network and makes it a Bayesian neural network using dropout and measures the certainty using the variation ratio. The second embodiment allows the predictive model to be any kind of model and directly estimates the probability that the predictive model is correct for a particular entity.

Computing Environment

Figure 2:
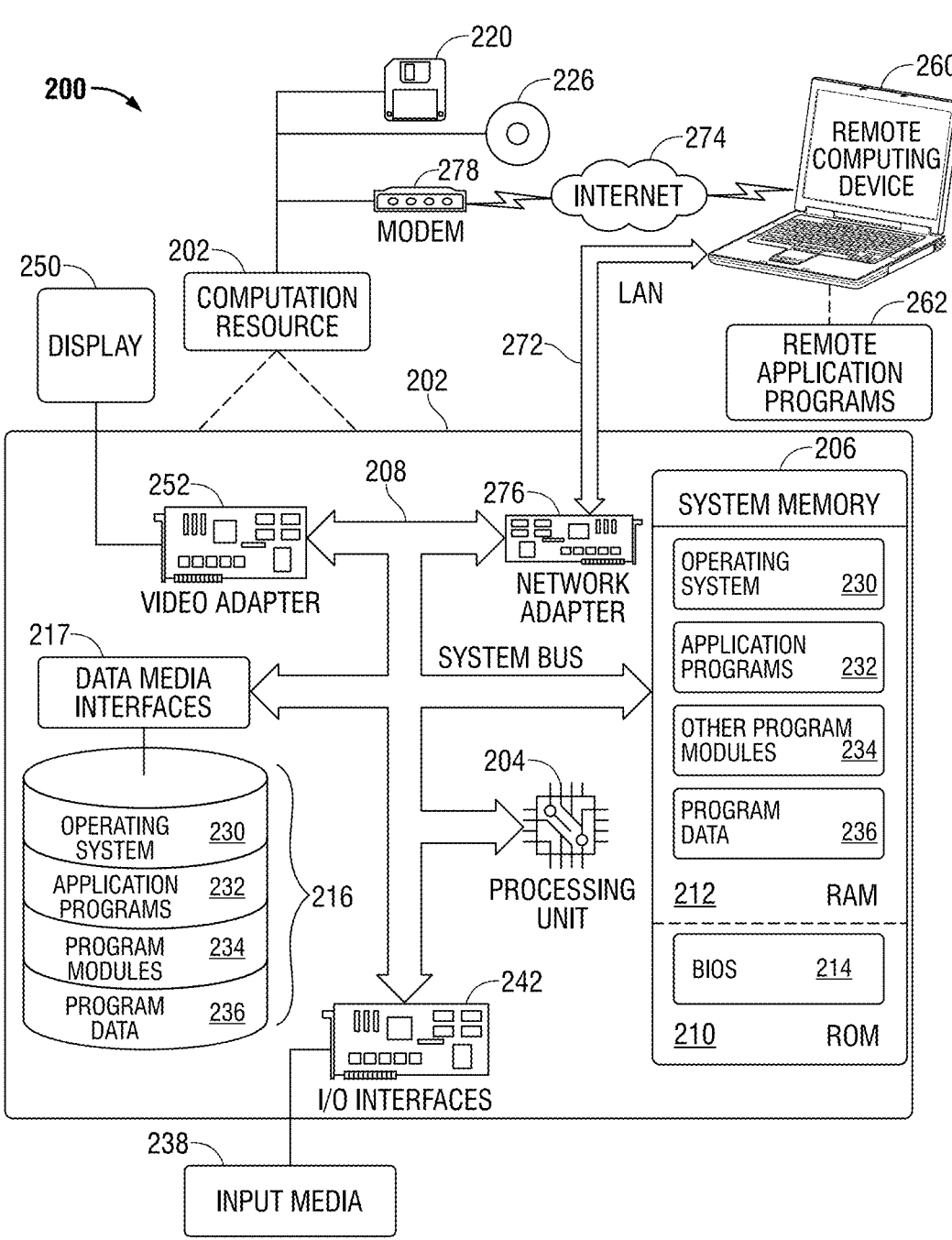
FIG. 2 illustrates an exemplary computing environment for implementing the methods described herein.

FIG. 2 illustrates an example of a general computer environment 200 applicable to the context of the environments of FIGS. 1 and 3, in accordance with an implementation of the disclosed subject matter. The general computer environment 200 includes a computation resource 202 capable of implementing the processes described herein. It will be appreciated that other devices can alternatively used that include more components, or fewer components, than those illustrated in FIG. 2.

The illustrated operating environment 200 is only one example of a suitable operating environment, and the example described with reference to FIG. 2 is not intended to suggest any limitation as to the scope of use or functionality of the implementations of this disclosure. Other computing systems, architectures, environments, and/or configurations can be suitable for implementation and/or application of the subject matter disclosed herein.

The computation resource 202 includes one or more processors or processing units 204, a system memory 206, and a bus 208 that couples various system components including the system memory 206 to processor(s) 204 and other elements in the environment 200. The bus 208 represents one or more of any of several types of bus structures, including a memory bus or memory controller, a peripheral bus, an accelerated graphics port and a processor or local bus using any of a variety of bus architectures, and can be compatible with conventional bus architectures and protocols. Bus 208 may include logical and physical interconnection, including a network or WAN connection, to operationally couple one or more system components located remotely to other system components coupled to Bus 208.

The computation resource 202 may include computers or processors operating in parallel, including architectures in which some of the computers or processors are remote and/or virtual. Computation resource 202 may be implemented on one or more servers that perform the software functions in a hosted Software As A Service (SAAS) environment.

The system memory 206 includes nonvolatile read-only memory (ROM) 210 and random access memory (RAM) 212, which may or may not include volatile memory elements. A basic input/output system (BIOS) 214, containing the elementary routines that help to transfer information between elements within computation resource 202 and with external items, typically invoked into operating memory during start-up, is stored in ROM 210. System memory 206 may contain non-volatile or volatile memory components located remotely and coupled to computation resource 202 by conventional logical and/or physical interconnections, including a network or WAN connection.

The computation resource 202 further can include a non-volatile read/write memory 216, represented in FIG. 2 as a hard disk drive, coupled to bus 208 via a data media interface 217 (e.g., a SCSI, ATA, or other type of interface); a magnetic disk drive (not shown) for reading from, and/or writing to, a removable magnetic disk 220 and an optical disk drive (not shown) for reading from, and/or writing to, a removable optical disk 226 such as a CD, DVD, or other optical media. Non-volatile read/write memory 216 may include one or more non-volatile memory components located remotely and coupled to computation resource 202 by conventional logical and/or physical interconnections, including a network or WAN connection.

The non-volatile read/write memory 216 and associated computer-readable media provide nonvolatile storage of computer-readable instructions, data structures, program modules and other data for the computation resource 202. Although the exemplary environment 200 is described herein as employing a non-volatile read/write memory 216, a removable magnetic disk 220 and a removable optical disk 226, it will be appreciated by those skilled in the art that other types of computer-readable media which can store data that is accessible by a computer, such as magnetic cassettes, FLASH memory cards, random access memories (RAMs), read only memories (ROM), and the like, can also be used in the exemplary operating environment.

A number of program modules can be stored via the non-volatile read/write memory 216, magnetic disk 220, optical disk 226, ROM 210, or RAM 212, including an operating system 230, one or more application programs 232, other program modules 234 and program data 236. Examples of computer operating systems conventionally employed include LINUX,® Windows® and MacOS® operating systems, and others, for example, providing capability for supporting application programs 232 using, for example, code modules written in a conventional computer programming language or an interpreted language such as Python.

A user can enter commands and information into computation resource 202 through input devices such as input media 238 (e.g., keyboard/keypad, tactile input or pointing device, mouse, foot-operated switching apparatus, joystick, touchscreen or touchpad, microphone, antenna etc.). Such input devices 238 are coupled to the processing unit 204 through a conventional input/output interface 242 that is, in turn, coupled to the system bus. A monitor 250 or other type of display device is also coupled to the system bus 208 via an interface, such as a video adapter 252. One or more remote input devices or display devices may be coupled to computation resource 202 by conventional logical and/or physical interconnections, including a network or WAN connection.

The computation resource 202 can include capability for operating in a networked environment using logical connections to one or more remote computers, such as a remote computer 260. The remote computer 260 can be a personal computer, a server, a router, a network PC, a peer device or other common network node, and typically includes many or all of the elements described above relative to the computation resource 202. In a networked environment, program modules depicted relative to the computation resource 202, or portions thereof, can be stored in a remote memory storage device such as can be associated with the remote computer 260. By way of example, remote application programs 262 reside on a memory device of the remote computer 260. The logical connections represented in FIG. 2 can include interface capabilities, a storage area network (SAN, not illustrated in FIG. 2), local area network (LAN) 272 and/or a wide area network (WAN) 274, but can also include other networks.

Such networking environments are commonplace in modern computer systems, and in association with intranets and the Internet. In certain implementations, the computation resource 202 executes an Internet Web browser program (which can optionally be integrated into the operating system 230), such as the "Internet Explorer®" Web browser manufactured and distributed by the Microsoft Corporation of Redmond, Washington.

When used in a LAN-coupled environment, the computation resource 202 communicates with or through the local area network 272 via a network interface or adapter 276. When used in a WAN-coupled environment, the computation resource 202 typically includes interfaces, such as a modem 278, or other apparatus, for establishing communications with or through the WAN 274, such as the Internet. The modem 278, which can be internal or external, is coupled to the system bus 208 via a serial port interface.

In a networked environment, program modules depicted relative to the computation resource 202, or portions thereof, can be stored in remote memory apparatus. It will be appreciated that the network connections shown are exemplary, and other means of establishing a communications link between various computer systems and elements can be used.

A user of a computer can operate in a networked environment using logical connections to one or more remote computers, such as a remote computer 260, which can be a personal computer, a server, a router, a network PC, a peer device or other common network node, a laptop computer, notebook computer, palm top computer, network computer, smart phone, tablet, or other mobile device, or any processor-controlled device capable of performing the steps, methods, and functions described herein. Typically, a remote computer 260 includes many or all of the elements described above relative to the computer 200 of FIG. 2.

Embodiments described herein can be implemented on an Amazon g2.2xlarge GPU machine, an Amazon c4.8xlarge, or a multi-core CPU machine. The computer system may be implemented using other computer architectures (for example, a client/server type architecture, a mainframe system with terminals, an ASP model, a peer to peer model, and the like) and other networks (for example, a local area network, the internet, a telephone network, a wireless network, a mobile phone network, and the like), and those other implementations are within the scope of the invention since the invention is not limited to any particular computer architecture or network.

The computation resource 202 typically includes at least some form of computer-readable media. Computer-readable media can be any available media that can be accessed by the computation resource 202. By way of example, and not limitation, computer-readable media can comprise computer storage media and communication media.

Computer storage media include volatile and nonvolatile, removable and non-removable media, implemented in any method or technology for storage of information, such as computer-readable instructions, data structures, program modules or other data. The term "computer storage media" includes, but is not limited to, RAM, ROM, EEPROM, FLASH memory or other memory technology, CD, DVD, or other optical storage, magnetic cassettes, magnetic tape, magnetic disk storage or other magnetic storage devices, or any other media which can be used to store computer-intelligible information and which can be accessed by the computation resource 202.

Communication media typically embodies computer-readable instructions, data structures, program modules. By way of example, and not limitation, communication media include wired media, such as wired network or direct-wired connections, and wireless media, such as acoustic, RF, infrared and other wireless media. The scope of the term computer-readable media includes combinations of any of the above.

More specifically, in the computer-readable program implementation, the programs can be structured in an object-orientation using an object-oriented language such as Java, Smalltalk or C++, an interpreted language such as Python, or the programs can be structured in a procedural-orientation using a conventional procedural language such as C. The software components communicate in any of a number of means that are well-known to those skilled in the art, such as application program interfaces (API) or interprocess communication techniques such as remote procedure call (RPC), common object request broker architecture (CORBA), Component Object Model (COM), Distributed Component Object Model (DCOM), Distributed System Object Model (DSOM) and Remote Method Invocation (RMI). The components execute on as few as one computer as in general computer environment 200 in FIG. 2, or on at least as many computers as there are components.

With reference to FIGS. 1 and 3, the steps of algorithm 100 and the methods and processes of the ML models implementing the generative model 320, predictive model 360, certainty model 340, and explanatory model 380 are preferably performed by software application programs, packages, or suites of software applications that realize the models in computer software program instructions that may reside on a single computer or distributed over multiple computers. The software preferably is stored with other Application Programs 232 in non-volatile read/write memory 216 and includes instructions that, when executed by the one or more processing units 204, cause the computation resource 202 to perform the steps of algorithm 100 and the methods and processes of the ML models implementing the generative model 320, predictive model 360, certainty model 340, and explanatory model 380, respectively, to produce synthetic data records, to produce predictions, certainty estimates, and explanatory estimates, and store the synthetic data records, predictions, certainty estimates, and explanatory estimates in data files with other program data 236 in non-volatile read/write memory 216.

The improved performance of the predictive model in predicting minority-class events, after being trained on a training set comprising synthetic minority-class data records, is a technological improvement. Compare two machine learning models, M and M', designed to make predictions regarding membership in a minority class, where M is trained on an training set that has been augmented with synthetic minority-class training records, and M' has been trained on an un-augmented data set without synthetic minority-class training records. The model M will make more accurate predictions than M', and it will do so because the predictive data and procedures of M—stored as data in memory—will be different from the predictive data and procedures of M' because the two models were trained on different data sets.

The terms and descriptions used herein are set forth by way of illustration only and are not meant as limitations. Those skilled in the art will recognize that many variations are possible with the spirit and scope of the invention, including as defined in the claim and their equivalents. The described embodiments illustrate the scope of the claim but do not restrict the scope of the claims.

What is claimed is:

1. A system of machine learning ("ML") models for making actionable predictions regarding a low-incidence event, comprising:

a plurality of input data records comprising one or more features relevant to a low-incidence event, including a first input data record, each input data record comprising one or more medical records;

an augmented data set of one or more training medical records, comprising one or more synthetic minority-class records corresponding to the low-incidence event and generated by an iterative computational process;

a predictive ML model that has been trained using iterative computational processes on the augmented data set of one or more training medical records, wherein when applied to the first input data record the predictive ML model is programmed to perform an iterative computational process to produce a first prediction regarding the low-incidence event, wherein a positive prediction comprises a prediction that there is a risk of occurrence of the low-incidence event or that the input data record is a minority-class record; and a certainty ML model which when applied to the first input data record and the first prediction will use an iterative computational process to generate a first certainty estimate comprising a probability that a positive prediction is correct.

2. The system of ML models for making actionable predictions regarding a low-incidence event of claim 1, wherein the augmented data set of one or more training medical records further comprises a plurality of majority-class records and a plurality of original minority-class records corresponding to the low-incidence event, each original minority-class record having a same minority-class label, wherein the one or more synthetic minority-class records have the same minority-class label.

3. The system of ML models for making actionable predictions regarding a low-incidence event of claim 2, wherein one or more synthetic minority-class records was generated by a computational process performed by a generative ML model that has learned through iterative computational processes to generate a synthetic record by changing a feature value of an original minority-class record such that the synthetic record is likely to be a minority-class record.

4. The system of ML models for making actionable predictions regarding a low-incidence event of claim 1, wherein:

the predictive ML model comprises a predictive neural network; and the certainty ML model uses the predictive neural network to generate the first certainty estimate.

5. The system of ML models for making actionable predictions regarding a low-incidence event of claim 1, further comprising:

an explanatory ML model which when applied to the first input data record and the first prediction will generate first explanatory data using one or more iterative computational processes, said first explanatory data comprising one or more features in the first input data record correlated with the first prediction.

6. The system of ML models for making actionable predictions regarding a low-incidence event of claim 5, wherein:

the explanatory ML model associates weight values with input data record features, and the one or more features in the first explanatory data correspond to the input data record features with the highest weight values after application of the explanatory ML model.

7. The system of ML models for making actionable predictions regarding a low-incidence event of claim 5, whereby the first explanatory data, the first certainty estimate, or both indicates which of a range of possible responses is more effective or appropriate in response to the first prediction.

8. The system of ML models for making actionable predictions regarding a low-incidence event of claim 5, whereby the system comprising the predictive ML model trained on an augmented data set of training medical records, the explanatory ML model, and the certainty ML model is adapted and configured to predict whether an input data record is correlated with the low-incidence event, the certainty associated with the prediction, and the one or more features in the input data record that are correlated to the prediction, thereby determining what responsive actions are likely to be effective or appropriate to respond to the prediction.

9. The system of ML models for making actionable predictions regarding a low-incidence event of claim 1, wherein the low-incidence event comprises risk of opioid use disorder.

10. A method of applying machine learning ("ML") models to make an actionable prediction regarding a low-incidence event from a medical record, comprising:

training a predictive ML model to make a prediction regarding a low-incidence event from a medical record, wherein training the predictive ML model comprises training the predictive ML on an augmented data set of training medical records using an iterative computational process, wherein the augmented data set of training medical records comprises one or more synthetic minority-class records corresponding to the low-incidence event and generated by an iterative computational process;

applying the trained predictive ML model to a first input data record comprising one or more medical records, comprising an iterative computational process, to produce a first prediction that the first input data record is or is not correlated with the low-incidence event; and applying a certainty ML model to the first input data record and the first prediction, comprising an iterative computational process, to generate a first certainty estimate comprising a probability that the first prediction is correct.

11. The method of applying ML models to make an actionable prediction of claim 10, wherein the augmented data set of training medical records further comprises a plurality of majority-class records and a plurality of original minority-class records corresponding to the low-incidence event, each original minority-class record having a same minority-class label, the one or more synthetic minority-class records have the same minority-class label.

12. The method of applying ML models to make an actionable prediction of claim 11, wherein one or more synthetic minority-class records was generated by a computational process performed by a generative ML model that has learned through iterative computational processes to generate a synthetic record by changing a feature value of an original minority-class record such that the synthetic record is likely to be a minority-class record.

13. The method of applying machine learning ("ML") models to make an actionable prediction of claim 10, further comprising:

applying an explanatory ML model to the first input data record and the first prediction, comprising an iterative computational process, to generate first explanatory data, said first explanatory data comprising one or more features in the first input data record correlated with the first prediction.

14. The method of applying ML models to make an actionable prediction of claim 13, wherein:

the predictive ML model comprises a predictive neural network;

the certainty ML model uses the predictive neural network to generate the first certainty estimate; and the explanatory ML model associates weight values with input data record features, and the one or more features in the first input data record in the first explanatory data correspond to the features with the highest weight values after application of the explanatory ML model.

15. The method of applying ML models to make an actionable prediction of claim 10, wherein the first prediction indicates two or more possible effective or appropriate responses to the first prediction, including a first possible response action and a different second possible response action, and further comprising:

identifying the first possible response action as more effective or appropriate than the second possible response action when the first certainty estimate comprises a high probability that the first prediction is correct.

16. The method of applying ML models to make an actionable prediction of claim 13, wherein the explanatory ML model is applied only when the first certainty estimate comprises a high probability that the first prediction is correct.

17. The method of applying ML models to make an actionable prediction of claim 13, wherein the first prediction indicates two or more possible effective or appropriate responses to the first prediction, including a first possible response action and a different second possible response action, and further comprising:

identifying the first possible response action as more effective or appropriate than the second possible response action when the first possible response action is related to at least one of the one or more features correlated with the first prediction in the first explanatory data.

18. The method of applying ML models to make an actionable prediction of claim 10, wherein the low-incidence event comprises risk of opioid use disorder.

19. A system of machine learning ("ML") models for making actionable predictions regarding risk of opioid use disorder, comprising:

a plurality of input data records comprising one or more features relevant to risk of opioid use disorder, including a first input data record, each input data record comprising one or more medical records;

an augmented data set of one or more training medical records, comprising a plurality of majority-class records, a plurality of original minority-class records corresponding to the low-incidence event, each original minority-class record having a same minority-class label, and one or more synthetic minority-class records having the same minority-class label, wherein one or more of the synthetic minority-class records were generated by an iterative computational process; and a predictive ML model comprising a predictive neural network that has been trained using iterative computational processes on the augmented data set of one or more training medical records, wherein when applied to the first input data record the predictive ML model is programmed to use an iterative computational process to produce a first prediction regarding risk of opioid use disorder, wherein a positive prediction comprises a prediction that there is a risk of opioid use disorder or that the input data record is a minority-class record;

an explanatory ML model which when applied to the first input data record and the first prediction will generate first explanatory data using one or more iterative computational processes, said first explanatory data comprising one or more features in the first input data record correlated with the first prediction, wherein the explanatory ML model associates weight values with input data record features, and the one or more features in the first input data record in the first explanatory data correspond to the features with the highest weight values after application of the explanatory ML model;

a certainty ML model which when applied to the first input data record and the first prediction will use the predictive neural network to generate a first certainty estimate comprising a probability that a positive prediction is correct; and a display device, whereby the first prediction, the first explanatory data, or the first certainty estimate may be displayed.

20. The system of ML models for making actionable predictions regarding risk of opioid use disorder of claim 19, whereby the system comprising the predictive ML model trained on an augmented data set of training medical records, the explanatory ML model, and the certainty ML model is adapted and configured to predict whether an input data record is correlated with a risk of opioid use disorder, the certainty associated with the prediction, and the one or more features in the input data record that are correlated to the prediction, thereby determining what responsive actions are likely to be effective or appropriate to respond to the predicted risk of opioid use disorder.

\* \* \* \* \*